United States Patent [19]

Angilletta

[11] 4,002,159

[45] Jan. 11, 1977

[54] VENETIAN BLIND FOR SOLAR HEATING

[76] Inventor: Domenick J. Angilletta, 223 E. Knight Ave., Collingswood, N.J. 08108

[22] Filed: Nov. 7, 1975

[21] Appl. No.: 629,693

[52] U.S. Cl. .................................. 126/270; 237/1 A
[51] Int. Cl.² .......................................... F24J 3/02
[58] Field of Search ............ 126/270, 271; 237/1 A

[56] References Cited

UNITED STATES PATENTS

| | | | |
|---|---|---|---|
| 2,595,905 | 5/1952 | Telkes | 126/270 |
| 2,857,634 | 10/1958 | Garbade et al. | 126/270 |
| 2,918,709 | 12/1959 | Corcoran | 126/270 |
| 3,048,375 | 8/1962 | Walker | 126/270 |

*Primary Examiner*—Kenneth W. Sprague
*Attorney, Agent, or Firm*—Morton C. Jacobs

[57] ABSTRACT

A venetian blind with a heat-absorptive surface on one side of the slats distributes solar heat into the ambient air of a room. For space heating the vertically-oriented, highly heat-absorptive surface of the blind has its temperature increased as solar radiation generally in the form of direct sunlight passes through the glass of the window sash and impinges on the energy-absorbing surface. Ambient air from the room moving by natural convective action, enters the air space between the window sash and venetian blind through openings in the bottom rail and between slats of the blind, passes over the heated surface in heat exchange relationship thereto, is warmed, leaves the air space through openings in the head rail of the blind and re-enters the enclosure at an elevated temperature. The other side of each slat of the blind has a reflective surface which when turned to receive the solar radiation, as in the summer, reduces heat entry into the room.

7 Claims, 7 Drawing Figures

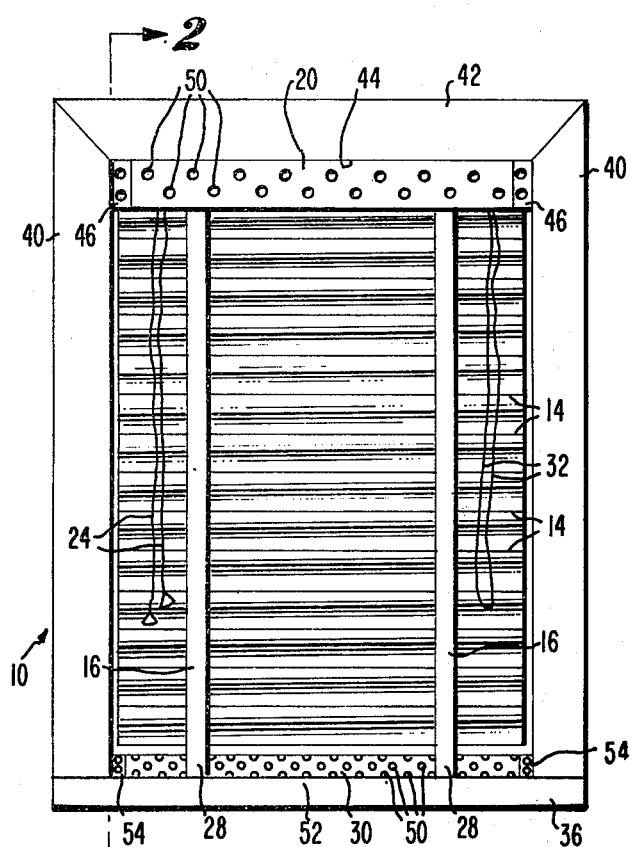
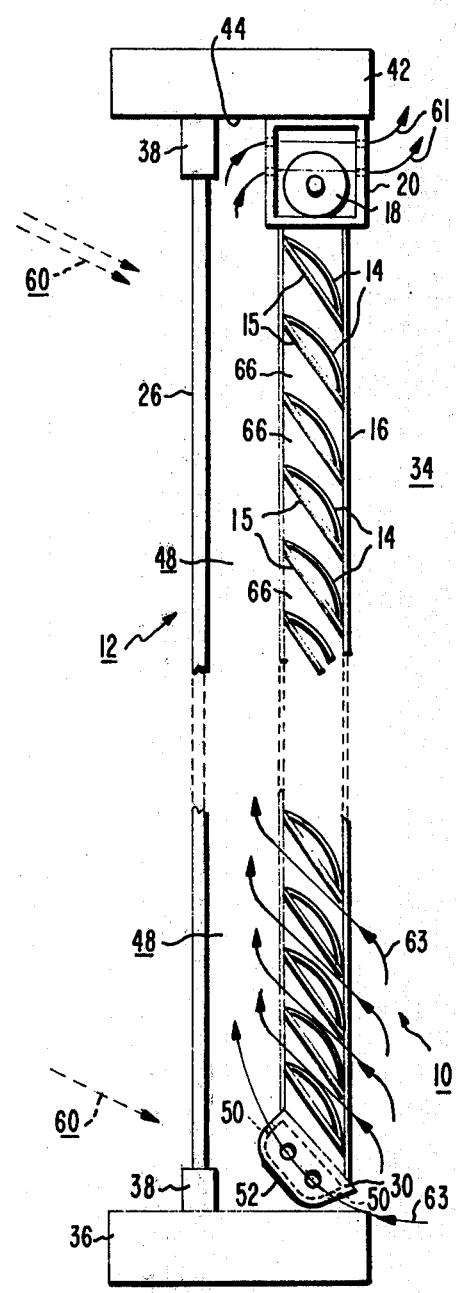
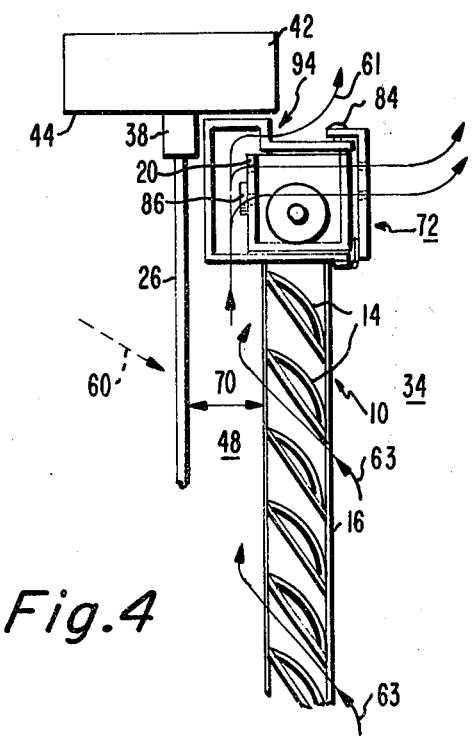
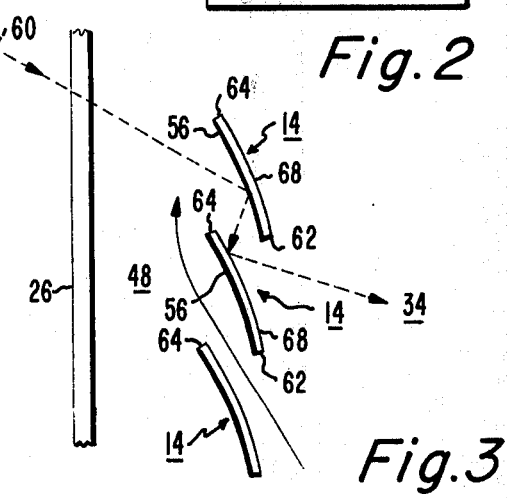
Fig. 1
Fig. 2
Fig. 4
Fig. 3

VENETIAN BLIND FOR SOLAR HEATING

BACKGROUND OF THE INVENTION

This invention relates to a thermal energy utilization and conservation apparatus for use on a conventional window sash where such window sash is oriented to receive solar radiation.

Fuel economy in heating enclosed spaces, energy conservation and reduction in heating system installation costs are more desirable today than ever before when considered in relation to fuel shortages, high fuel costs and national policy. Prior to construction, buildings can be designed and located at a site to advantageously use topography, sun positions, prevailing winds, adjacent buildings, natural shading, material color and texture, etc., in order to reduce heating requirements. Economics and availability of fuel supplies can be factored into selection of the thermal control system.

However, for the majority of heated structures, whether residential, commercial or industrial, which are already constricted and in use, significant reduction in comsumption of thermal energy is only accomplished by reduction in usage of the facility or its heat generating equipment or by relatively significant and costly modification to the structure to reduce heating requirements.

Venetian blinds have been used in the past to control entrance to an enclosure of light and thermal energy by using a highly heat-absorptive coating on one face of the blind slats and a reflective surface on the other face. Blinds of this type are described in U.S. Pat. Nos. 2,288,465, 2,857,634 and 3,012,294. However, conventional blinds have been inefficient and ineffective in delivering solar heat to a room because a blind having its slats in the "closed" position to block direct sunlight (and prevent fading of curtains, carpets, furniture, etc.) transfers heat to the room only from the slat surfaces facing into the room. This occurs by natural convection of room air over the inner surface which, unfavorably from the standpoint of heat transfer, has a temperature not insubstantially cooler than the outside surface directly receiving radiant energy. Little, if any, energy passes directly to the room air from the hotter outer slat surfaces because present venetian blind construction and installation traps air and prevents free circulation in the space between window pane and slat surfaces.

Thus, desirable features in the construction of a blind apparatus using solar energy to supplement room heating are efficient performance, simplicity, ease of installation, low initial cost, attractive appearance and minimal, if any, power consumption in operation.

SUMMARY OF THE INVENTION

Accordingly, it is among the objects of this invention to provide a new and improved venetian blind apparatus to utilize radiant solar energy to heat an enclosed space such as a room in a residence.

Other objects are to provide a solar heating and energy conservation apparatus which has one or more of the following features: effective performance, economical cost, little, if any, operating expense, simple installation, and attractive appearance.

In one embodiment of this invention a venetian blind installed at a window provides room (or other enclosure) heating control by means of improved head and bottom rails and special purpose coatings applied to both faces of each slat. The concave face of each blind slat has a highly heat-absorptive surface thereon and the opposite face has a highly reflective surface; openings in the head rail and bottom rail permit free air circulation by natural convection between the room to be controlled and the air space between the window and blind slats. For room heating, the slats are oriented in the "closed" position and the highly heat-absorptive surface is exposed to solar radiation entering the window glass whereby the temperature of the slats increase. Air contacting or adjacent the hot surfaces is heated and this heated air otherwise trapped in the space between slats and window glass rises and passes through the openings in the head rail to enter the room. Simultaneously, cooler air from the room moves to replace the outflowing heated air, passing through openings in the bottom rail and through upwardly oriented passages which exist between slats (even in a "closed" orientation). Thus, a continuous circulation current of air is caused to enter the space between slats and window pane, be heated, rise and exit without expenditure of energy.

Additionally, by similar "chimney" effect, heat is transferred to the room by air flowing upwardly over the cooler, but nevertheless hot, slat surfaces facing the room interior.

In hot weather the slats are oriented to expose their highly reflective surface to the sun's incoming rays thereby turning away the thermal energy before it enters the room space. Thus, the quantity of heat entering the room is reduced, comfort is improved and, where an active cooling system is employed, cooling load, power consumption and equipment requirements are reduced.

The device is mounted in the window pane in a manner similar to that used with a conventional venetian blind, requires no modification to the existing building structure, and presents an attractive appearance when viewed from inside or outside the building.

BRIEF DESCRIPTION OF THE DRAWING

The foregoing and other objects of this invention as well as various features thereof, may be more fully understood from the following description when read together with the accompanying drawing, in which:

FIG. 1 is a front elevational view of the venetian blind of this invention as seen from within a room;

FIG. 2 is a side view, with parts omitted, of the blind of this invention taken along the section 2—2 of FIG. 1;

FIG. 3 is a partial side view to an enlarged scale, with parts omitted, of overlapping venetian blind slats with the concave sides facing a window;

FIG. 4 is a partial side view of an embodiment of this invention similar to FIG. 2 using a special mounting bracket;

In the drawing, corresponding parts are referenced by similar numerals throughout. Figures are not to scale and for clarity of illustration, scale varies between views.

DESCRIPTION OF A PREFERRED EMBODIMENT

In an embodiment of this invention, FIGS. 1–3, an otherwise conventional venetian blind 10 installed in window 12 is improved and adapted for efficient control of solar heating of an enclosure by incorporation of a plurality of vent holes in the head rail and bottom rail of the blind. These vent holes enhance heat transfer from the slats of the blind by allowing air from the enclosure to be heated to circulate freely by natural convection through the space between the window pane and the slats. A highly heat-absorptive coating on the slat surface facing the window pane substantially absorbs incoming solar radiation and further improves the heat transfer effectiveness of the apparatus.

Figure 5:
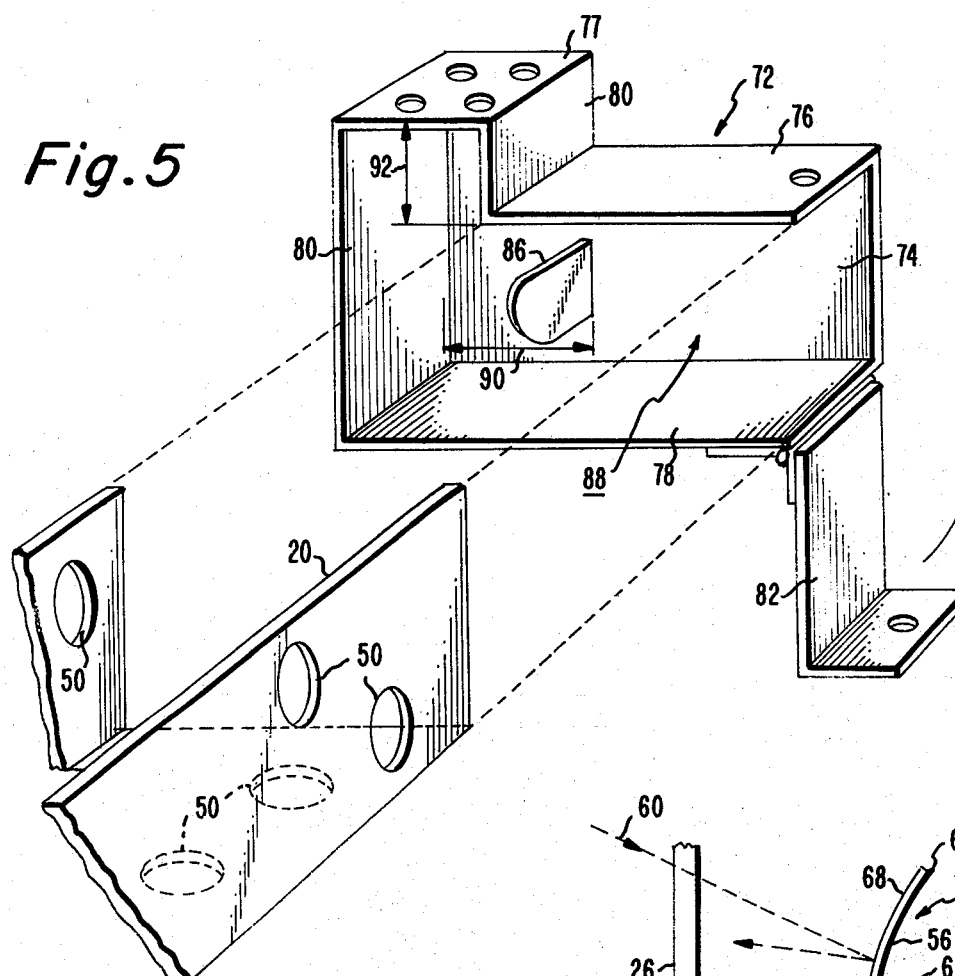
FIG. 5 is an exploded partial view of the special bracket in relation to the blind of FIG. 2.
Figure 6:
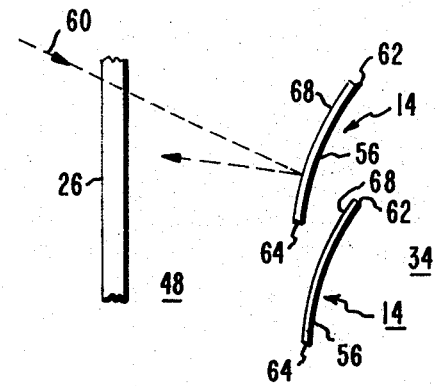
FIG. 6 is a partial side view similar to FIG. 3 with the convex sides of the slats facing a window; and, FIG. 7 is a front view of a modification.

The venetian blind 10 of this invention in a window 12 is comprised of a plurality of elongated horizontal slats 14 of arcuate cross-section (FIGS. 2, 3) supported in spaced parallel relationship one to the other on the rungs 15 of a plurality of vertical ladder-like flexible tapes 16. In the known manner by means of known mechanisms cooperating with said flexible tapes 16 including a tilt rod, tape barrels, (not shown) and tilt gear 18 located within the head rail 20 at the top end of the blind 10, the slats 14 are each tiltable in unison about a longitudinal axis through an angle approximately 180°. See FIGS. 3, 6. A pair of operating cords 24 engaging the tilt mechanism extend downward from the head rail 20 and depending upon which cord 24 is pulled and the distance pulled the arcuate slats 14 are tilted to expose either the concave or convex faces to the window pane 26, generally parallel thereto or at any intermediate angle.

As in conventional venetian blinds of known design, the flexible tapes 16 attach by means of tape clips 28 at their bottom ends to the bottom rail 30. A second pair of operating cords 32 to raise and lower the blind 10 attach one at either side to the bottom rail 30, pass upward through openings (not shown) in the slats 14, enter the head rail 20, engage pulleys (not shown) therein, emerge together from the head rail 20 via a cord lock device (not shown) and extend downward from the head rail 20 into the room 34. By pulling the free-hanging portion of these cords 32 and releasing and engaging the cord lock in the known manner, the bottom rail 30 is raised or lowered and fixed in any position intermediate the head rail 20 and the fully-extended condition, FIG. 1, of the flexible tapes 16 when the bottom rail 30 rests on the sill 36 of the window 12. The flexible tapes 16 fold and lower slats 14 rest one on another, all in the known manner, as the bottom rail 30 is raised. Other methods are known and may be used for tilting of slats and height adjustment of the bottom rail; however, none of the means and procedures described above are to be considered as novel parts of this invention.

As seen in FIGS. 1, 2, the venetian blind 10 of this invention is secured within the recess of the frame of a window 12 comprised of the sash 38, glass pane 26, generally horizontal sill 36 at the bottom, vertical window jambs 40 at opposite sides and a horizontal lintel 42 at the top. The head rail 20 seats against the side jambs 40 and rests against the lower horizontal face 44 of the lintel 42 and is fixedly attached thereto by end brackets 46 attached by suitable means (e.g., nails, screws) to the jambs 40. In the fully extended condition the bottom rail 30 of the blind 10 rests upon the window sill 36. The assemblage of horizontal slats 14 lying generally in a plane parallel to the transparent glass pane 26 of the window 12 have an air space 48 between the pane 26 and the slats 14.

The improvements in the venetian blind of this invention result in one embodiment from modified design of the head rail and bottom rail each of which has a plurality of holes passing through its exposed surfaces. The head rail 20 is an elongated, rigid, e.g., sheet metal, generally U-shaped channel open at the top and ends and having a plurality of vent holes 50 in each face. For the free passage of air the bottom rail 30, which is hollow has holes 50 in every surface including the bottom surface 52 which is curved away from the flat surface of the sill 36 or in a tilted position when the slats 14 are tilted (FIG. 2). Caps 54 at both ends provide ornamental closures for the bottom rail 30. Vent holes 50 in the caps 54 and end brackets 46 enhance air circulation.

The slats 14 are finished on the concave face 56 with a highly heat absorbing coating, e.g., black paint, (not shown), to efficiently absorb solar radiation 60 entering through the glass window pane 26 and impinging directly (or by reflection) on the concave surface 56. Slat temperature increases as energy is absorbed. Generally solar radiation 60 is best absorbed and room heating is effective when the blind slats 14 are oriented to the approximately vertical "closed" position (FIG. 3) with concave faces 56 facing the window glass 26 and with the lower edge 62 of each slat 14 overlapping and concealed by the upper edge 64 of the next lower slat 14 as seen through the window pane 26.

As the temperature of the slats 14 increases because of the absorption of solar radiation 60, air in contact or in close proximity with the slat faces is heated and rises by natural convection. Air on the room side 34 of the slats 14 moves freely in a natural circulating manner from the heated slats 14 to the interior of the room 34. Air in the air space 48 between the window glass 26 and the "closed" slats 14 is heated by contact and proximity to the concave absorptive faces 56, rises and leaves the air space 48 through the plurality of vent holes 50 in the head rail 20. (Air outflow is generally represented by arrows 61 in FIG. 2). To replace the outflowing heated air 61 cooler air from the room 34 enters the air space 48 passing through plurality of holes 50 in the surfaces of the bottom rail 30 and through the narrow passages 66 which exist between adjacent slats 14 even in the so-called "closed" position. (Air inflow is generally represented by arrows 63 in FIG. 2). Air enters each passage 66 between the lower edge 62 of the hot concave face 56 and the convex room-facing face 68 of the slat 14 below and rises by natural convection in effective heat transfer relationship with the hot absorptive face 56. Thus, both slat faces 56, 68, i.e., facing the room interior 34 and facing the window glass 26, are active in transferring solar radiation 60 into the room ambient environment 34 when the radiation absorbent surfaces 56 face the window 12 and when a complete circuit for convective air flow between window pane 26 and slats 14 is provided. The air space 48 is of sufficient width 70 to allow substantially unimpeded natural circulating flow between the room 34 and the air space 48; approximately four inches between the slats 14 and the window glass 26 provides effective performance. The number, shapes and spacing of vent holes 50 in the head 20 and bottom rail 30 is not critical, performance improving generally as flow area increases. In the head rail 20 and bottom rail 30, a series of staggered holes 50 approximately 0.625 inch in diameter spaced approximately 0.75 inch apart in parallel rows approximately one inch apart provide effective performance.

In window frames of shallow depth, FIG. 4, such that sufficient space 48 between the blind slats 14 and the window glass 26 to allow adequate flow by natural convection is normally lacking, a pair of end brackets 72 one at each jamb 40 is used in mounting the blind 10 to the window frame. Each end bracket 72 is a thin, rigid (e.g., sheet metal) generally L-shaped receptacle having an L-shaped vertical face 74 (FIG. 4). Flanges extend in one direction perpendicularly from said vertical face 74 forming horizontal, top 76, 77 and bottom faces 78, and additional flanges 80 extend perpendicularly in the same direction from the vertical leg of the L-shaped face 74 thereby forming said L-shaped receptacle 72 open at the end of the horizontal leg and on one side. An angle 82 removably attached by a suitable fastener 84 (e.g., a sheet metal screw) to the upper horizontal face 76 and hingedly attached to the lower horizontal face 78 of the bracket 72 provides reversible closure for the open end of said bracket 72. In order to provide one left-hand and one right-hand bracket the flanges 76, 77, 78, 80 extend on separate brackets 72 in opposite directions from the vertical L-shaped faces 74. A thin, rigid, vertical tab 86 extends perpendicularly from the vertical L-shaped face 74 in the direction of the flanges 76-78, 80 described above for purposes explained hereinafter.

In use the brackets 72 are mounted in the recess of the window frame, one on each side with the vertical L-shaped side 74 generally perpendicular to the window glass 26 and adjacent and parallel to the side of the jamb 40. The uppermost horizontal face 77 of the bracket 72 is generally parallel and adjacent to the horizontal face 44 of the lintel 42 and the bracket 72 is fixedly attached to these surfaces by means of suitable fasteners (not shown), e.g., screws, nails.

The compartment 88 in the bracket 72 bounded by the tab 86, and upper and lower flanges 76, 78 has a height and depth approximately equalling the height and depth, respectively, of the head rail 20. When assembled, blind 10 to bracket 72, the head rail 20 is positioned and nested in the compartment 88, resting against the tab 86 and upon the lower flange 78. The hinged end cover 82 of the bracket 72 allows for easy entry and withdrawal of the head rail 20 from the room side 34 of the bracket for mounting or removal of the blind 10. When positioned in the bracket 72, as described above, the blind 10 is spaced from the window glass 26 by an additional amount approximately equalling the distance 90 between sash 38 and the bracket tab 86 whereby adequate passage 70 for air between the window pane 26 and the slats 14 is provided. Additionally, the headrail 20 when supported in the end brackets 72 is lowered from the lintel 42 by a distance 92 approximately equalling the difference between the height of the vertical leg of the L-shaped bracket 72 and the height of the head rail 20 thereby providing an unobstructed opening 94 (FIG. 4) to replace or supplement the vent holes 50 in the head rail 20 for passage of air into the room 34 from the space 48 between window glass 26 and slats 14.

Application of the highly heat-absorbing coating uniformly to the concave side 56 of the arcuate slats 14 improves the effectiveness of the blind 10 in collecting the sun's radiant energy 60. As seen in FIG. 3, the slats 14 are in a nearly vertical ("closed") position for heating with the absorbent coated concave surfaces 56 facing the glass pane 26. Radiant energy 60 entering the window 12 from an angle generally above the horizontal impinges on the absorbing surface 56 where it is partially absorbed and converted into heat and partially reflected. A portion of the reflected energy is diffused from the slat face 56 and directed back toward the window pane. Another portion of the reflected energy bounces from the first concave surface 56 to strike the convex back surface 68 of the slat 14 directly below where it is partially absorbed and converted into heat and partially reflected into the room 34. Uniformity and smoothness of the absorptive coating reduce diffused reflection (and ensure a greater degree of reflection in accordance with the known physical principle that reflection angle will equal the angle of incidence) and thereby provide for increased reception of reflected energy by the slat 14 directly below the initially receiving slat. Thus, both heat and a limited amount of light enter the room 34 in the heating mode of operation; the amount of light entering the room 34 is advantageously controlled by tilting the slats without allowing direct sunlight to contact fabrics and wooden surfaces subject to fading.

In the summer or anytime that solar heating is not desirable the slats 14 are tilted to have the concave absorptive surfaces 56 facing into the room 34 and the convex surfaces 68 facing the window 26. In this condition (FIG. 6) the lower edge portion 64 of the convex face 68 of each slat overlaps and conceals the upper edge portion 62 of the slat 14 immediately below as seen from the window 26. With the slats in this position, the rays 60 of the sun striking the convex surfaces 68 are partially absorbed and partially reflected; however, the reflective angle is such that reflected radiation is directed toward the window glass 26 and not into the room 34. A special highly-reflective surface coating or finish, e.g., polished aluminum, may be applied to the convex face 68 to minimize the amount of solar radiation 60 which is absorbed and converted to heat; however, many attractive colors, e.g., white, pastels, also provide substantial reflection of solar radiation. Thus, the outwardly facing convex surface 68 is more effective in the "closed" position in rejecting incoming solar heat and light than would be concave surface 56, and, conversely, the outwardly facing concave surface 56 is more efficient in the "closed" position accepting incoming solar heat and light than would be a convex surface 68. The use of the highly heat absorbing surface on the concave slat face 56, and the highly-reflective surface on the convex slat face 68 further amplifies the advantage of each condition of operation.

Additionally, with the slats 14 approximately at the midpoint between the two opposite "closed" positions, FIG. 1, the concave side 56 of the conventional blind 10 faces downward. Thus, in the summer with the slats horizontally tilted for viewing and entry of light through the window 12, the highly heat-absorbent face 56 is concealed completely from direct solar radiation 60 and undesirable heat transfer into the room 34 is not enhanced.

Various modifications of this invention may be made and will be apparent from the foregoing description which is presented by way of illustration of and not as a limitation on the scope of this invention. For example, slat profiles other than arcuate may be used in other embodiments; nevertheless, head rail and bottom rail vent openings ensure effective heat transfer even when adjacent slats are in linear contact and substantially close off the flow passages between slats. Additionally, a plurality of elongated slots may provide openings through the head and bottom rail as compared to the vent holes described above. In another embodiment removal of a slat adjacent the top and bottom rail provides enlarged passage respectively for air outflow and inflow to the space between the window pane and the slats.

Further, in an alternative embodiment a pair of enlarged endcaps are used, one at each end of the bottom rail. These endcaps extend beyond the profile contours of the bottom rail such that when the blind is fully lowered the endcaps contact the sill and the bottom rail is located above the sill. Thus, an unobstructed opening is provided below the bottom rail which may replace or supplement vent holes in the bottom rail for passage of air from the room to be heated into the space between window glass and slats.

Additionally, in a venetian blind of known design having vertically oriented slats provision at the bottom and top for free air entrance to and outflow from the space between slats and window glass will enhance the effectiveness of such a blind as a solar heater. Incorporation of a highly heat absorbing coating on the concave slat surface and a highly reflective coating to the convex slat surface will have further advantages as described above. As noted above, the reflective coating may take various forms and colors; likewise, the absorbing coating may assume different dark colors and still be effective absorbers, and it could have the same hue as the reflective coating.

Figure 7:
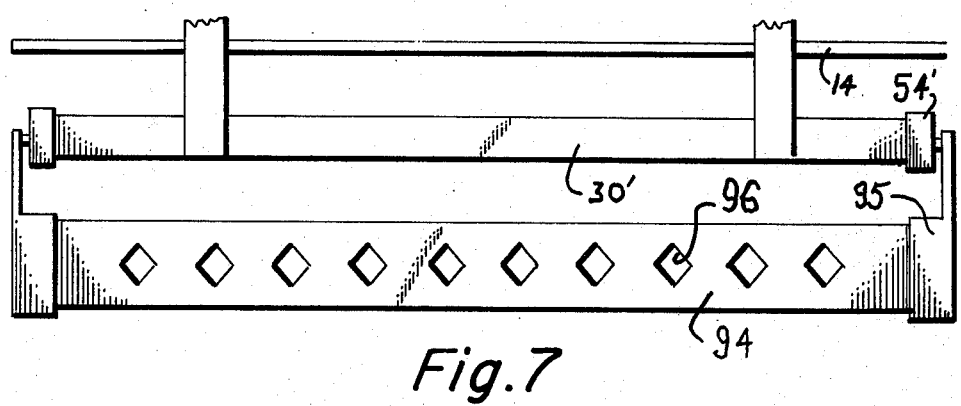

A modified ventilated bottom rail construction is shown in FIG. 7. The ventilated bottom rail 94 is a hollow tubular member generally rectangular and about the same width as the slats 14. End caps 95 enclose the tubular member and have pivot pins projecting from vertical extensions. These pivot pins engage in pivot holes provided in the end caps 54' of the conventional bottom rail 30. Thereby, when the blind is dropped, the pivoted rail 9 always hangs free due to the pivoted, pendulum-like action. The conventional bottom rail, when tilted for the solar heating operation and when touching the window sill, tends to block the movement of air at the bottom of the blind. This air blockage is prevented and actually air movement is ensured by reason of the pendulum rail. One set of slots 96 extend through the front and rear walls of the tubular member and pass air from the room to the window side of the blind. In addition, a set of slots in the top wall of the tubular member and along the window edge thereof also pass air from the tubular member onto the concave surface of the curved slats.

What is claimed is:

1. In a venetian blind for use in a room adjacent the pane of a window disposed to receive solar radiation and spaced therefrom:

a head rail attached to the frame of said window;
a tilt rod pivotably attached within said head rail;
a series of arcuate slats suspended vertically from said tilt rod and means flexibly interconnecting said slats in horizontally-oriented and vertically spaced relation;
a bottom rail flexibly interconnected with said series of slats;
means to pivot said tilt rod whereby said series of interconnected slats is reversibly tilted to present said arcuate slats at certain extreme positions with either concave or convex faces of said slats facing said window and substantially parallel thereto, and at intermediate positions;
means to raise, lower and reversibly fix said bottom rail and portions of said slats whereby said venetian blind is adjusted to expose without obstruction portions of said window;
the improvement therein being:
a highly heat-absorptive surface on the concave face of said arcuate slats, each of said slats when pivoted in said extreme position to expose said concave face to said window having the lower portion of said concave face overlapping and concealed by the upper portion of the adjacent slat as viewed from said window so that said incoming solar radiation is substantially absorbed and partly reflected upon impinging said absorptive surface, a portion of said reflected radiation secondarily reflecting from said adjacent overlapped slat and entering said room,
and an open generally upward extending passage between each of said slats and the upper portion of the slat next lower;
air passage means at said head rail connecting between said room and said window;
whereby solar radiation impinging on said absorptive surface heats said surface and heat transfers to air passing upwardly by natural convection through said passages between said slats and through said passage means at said head rail.

2. The venetian blind as recited in claim 1 the further improvement therein being passages through said bottom rail whereby air from said room enters between said window pane and said blind for heating.

3. The venetian blind as recited in claim 1 wherein said air passage means at said head rail comprises passages through said head rail whereby heated air flows to said room from between said window pane and said blind.

4. The venetian blind as recited in claim 1 the further improvement therein being said bottom rail spaced above the sill of said window so that room air is enabled to flow beneath said bottom rail into the space between said window pane and said blind for heating.

5. The venetian blind as recited in claim 1 the further improvement therein being means for attachment of said head rail to the frame of said window comprised of means to increase spacing of said blind from said window pane and provide a passage above said head rail whereby air flow within said space and from said space is enabled.

6. The venetian blind as recited in claim 5 wherein said means for attachment comprises a plurality of L-shaped receptacles of uniform depth each receptacle having a horizontal leg projecting perpendicularly into said room and a vertical leg adjacent the lintel of said window, and within said receptacle a compartment in the projecting end of said horizontal leg to receive and embrace an end of said head rail whereby said head rail is supported adjacent said window with a passage for air above said head rail and the space between said slats and said window pane increased for enabled air flow.

7. The venetian blind as recited in claim 1 the further improvement therein being a highly reflective surface on the convex face of each of said arcuate slats, each of said slats when pivoted in said extreme position to expose said convex face to said window, having the lower portion of said convex face overlapping and concealing the upper portion of the lower adjacent slat as viewed from said window incoming solar radiation is substantially reflected away from said room by said surface.

* * * * *